Nov. 25, 1958     J. HEUSCHKEL     2,862,102
WELDED STRUCTURE AND METHOD

Filed June 29, 1956     3 Sheets-Sheet 1

WITNESSES

INVENTOR
Julius Heuschkel.
BY
ATTORNEY

Fig. 9. AISI 347 Weld Metal

Fig. 10. AISI 307 Weld Metal 2,862,102
Patented Nov. 25, 1958

United States Patent Office

2,862,102
WELDED STRUCTURE AND METHOD

Julius Heuschkel, Irwin, Pa., assignor to Westinghouse Electric Corporation, East Pittsburgh, Pa., a corporation of Pennsylvania Application June 29, 1956, Serial No. 594,725

4 Claims. (Cl. 219—137)

This invention relates to arc welding and has particular relation to the welding of austenitic structures which are subjected to high stresses, particularly thermal stresses.

In many steam turbine electric generating plants superheated steam at temperatures of the order of 1050° F. is transmitted through conductors of large diameter composed of austenitic stainless steel and particularly of chromium-nickel-niobium steel having the designation AISI 347 which is low in tantalum and AISI 348 which has appreciable tantalum. The specific composition of AISI 347 stainless steel which is widely used for the conductors at this time is as follows:

|  | AISI limits |
|---|---|
| Chromium | 17%—20%. |
| Nickel | 9%—12%. |
| Manganese | 2.5%–maximum. |
| Silicon | .80%—maximum. |
| Carbon | .08%—maximum. |
| Niobium | at least 10 times carbon content. |
| Phosphorous | .04%—maximum. |
| Sulphur | .04%—maximum. |
| Iron | Remainder. |

These steam conductors include a number of welded structures in which, in accordance with the teachings of the prior art, the welds are composed of a weld metal which is the same as the base metal.

It has been found that in time the welded joints in the above-described steam conductors fail. On occasions this failure occurs after a conductor has been used for a reasonable interval. On other occasions it occurs when a conductor has been in use for only a short time. In either event the failure is serious not only because the conductors are costly but also because of the danger to which servicing and operating personnel and the adjacent equipment is subjected.

It is, accordingly, an object of this invention to provide a welded structure of austenitic stainless steel of the chromium-nickel-niobium type particularly suitable for use in steam conductors of steam generators which shall not have the tendency to fail encountered in the prior art structures.

Another object of this invention is to provide a method for welding austenitic stainless steel structures of the chromium-nickel-niobium type, particularly such structures as are used in steam conductors of steam generators, in the practice of which sound welds which shall not have a tendency to fail in service shall be produced.

A study of the prior art welds has lead to the discovery that the failure of the welds may occur at different times in the history of the structures. During the welding of the structures the weld metal and the base structure in the region of the weld metal are heated to a temperature of 2500° F. or 2600° F. It has been found that on occasions the welds fail during the first solidification of the weld metal as its temperature decreases from the fusion temperature to room temperature; failures of this type occur at temperatures of between 1600° F. and 2000° F. An attempt has been made to improve the weld structure by heat treatment and it has been found that the welds sometimes fail during this heat treatment. In addition, welds which have weathered the first cooling and the heat treatment fail during service at 1050° F. after extended time intervals which may vary from 1 to 10 years.

The discovery of the different conditions under which the welds may fail has lead to an investigation of the structural properties of the austenitic stainless steels under consideration and related materials. In making this study the structures are subjected to forces of known magnitude and the reaction of the material to the forces is observed. The welded structures which were tested were made by depositing so-called weld metal from a welding electrode on a so-called base by arc welding. Specimens of the base metal and of the weld metal were then subjected to structural tests. In describing this invention it appears desirable to go into this investigation briefly and for this purpose a number of properties of the structures tested, of the forces impressed on the base metal and the weld metal and of the reaction of the base metal and the weld metal should be defined.

In general, stress is defined as the force or load applied to a structure under test divided by the cross-sectional area across which the force or load is applied.

Strain is the reaction to the stress and in general is defined as the change in the dimension (length) of the structure along the direction of the applied force. Strain is usually expressed in percent of the original length.

Hot ductility is the ability of a structure to be strained at elevated temperatures and is measured by measuring the change in length or cross sectional area of the structure under stress. The greater the change in length or cross sectional area before fracture, the higher the ductility. With reference to high temperature alloys such as stainless steels, the word "hot" means temperatures of the order of 1000° F. or above.

In general, hot strength is the ability of a material to withstand stress without rupturing at elevated temperatures.

Fracture stress is defined as the force applied to a structure at the instant when the structure fractures divided by the final cross-sectional area across which the force is applied.

Nominal ultimate stress is defined as the maximum force resisted by the structure over the range of stresses applied to it to produce rupture divided by the original cross-sectional area across which the stressing force is applied. It is to be understood that as a rule during a rupturing operation the force applied to produce the final rupture may be substantially smaller than forces resisted by the structure before it reached the rupture point.

Yield stress is defined as the stress which produces .2% strain above the maximum elastic strain (that is the maximum strain of that portion of the stress strain characteristic where strain is proportional to stress). Yield stress is also sometimes defined as that which produces .5% strain above maximum elastic strain.

Fracture stress, nominal ultimate stress and yield stress measure strength; the higher they are the greater the strength.

Reduction in area during a stressing operation is defined as the difference between the original area and the final area at rupture expressed in percent of the original area.

Total elongation during a stressing operation is defined as the total change in length up to fracture expressed as a percent of the original unstressed strength.

Uniform elongation is the difference between the length at which the maximum force is resisted by the structure less the original length expressed as a percent of the original length.

Creep is the tendency of a material to continue to strain under stress applied continuously over a period of time.

This invention arises from the discovery that in welded structures of which the base and the weld metals are both AISI 347 or 348 stainless steel, the hot strength of the base is substantially lower than the hot strength of the weld metal while the ductility of both is relatively low. When such structures are heated or cooled the strains on the base metal produced by the stronger weld metal are such that the base metal tends to fail.

In accordance with this invention in its broader aspects, a structure is provided in which the weld metal is composed of a different material than the base; this material having a hot strength substantially equal to the hot strength of the base and having a ductility substantially higher than the ductility of the weld metal of the original material. Specifically, the weld metal for welding chromium-nickel-niobium type is a stainless steel of the austenitic stainless steels of the chromium-nickel type having a high manganese content, identified as AISI 307. This steel has a composition as follows:

| | AISI limits |
|---|---|
| Chromium | 18%–20.5%. |
| Nickel | 9.0%–10.7%. |
| Manganese | 3.3%–4.75%. |
| Silicon | .80%—maximum. |
| Carbon | .07%–.17%. |
| Molybdenum | 1.10%—maximum. |
| Phosphorous | .04%—maximum. |
| | .04%—maximum. |
| Iron | Remainder. |

The novel features considered characteristic of this invention are described generally above. The invention itself, both as to its organization and its method of operation together with additional objects and advantages thereof, will be understood from the following description of a specific embodiment when read in connection with the accompanying drawing, in which:

Figs. 9 and 10 are graphs showing the manner in which the failure of the weld metal of AISI 347 and 307, respectively, is affected by the time during which this weld metal is in existence.

Figure 1:
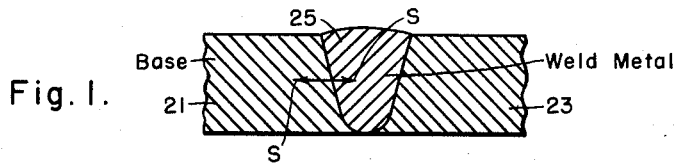
Figure 1 is a view in section showing a weld in accordance with this invention.

A typical welded structure involved in this invention is shown in Fig. 1. This structure includes a base consisting of two sections 21 and 23 which are joined by a weld 25. In the usual practice of this invention the base is composed of austenitic stainless steel of the chromium-nickel-niobium type and the weld metal of stainless steel of the high manganese chromium-nickel-molybdenum type. This structure is produced in accordance with the specific aspects of this invention. In accordance with the broader aspects of this invention weld metals of other types having hot strength of substantially the same magnitude as the hot strength of the base metal and substantially higher ductility may be used.

The advantages of the structure disclosed may be understood by considering the structural properties of the structure both with the weld metal and the base metal both composed of AISI 347 stainless steel and with the weld metal composed of AISI 307 and the base metal of AISI 347.

Figure 2:
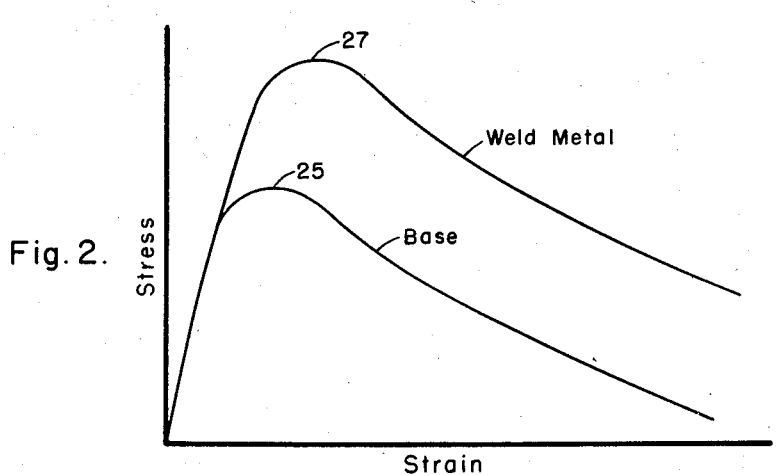
Fig. 2 is a graph showing the relationship between the hot strengths of the weld metal and the base for prior art structures.

In Fig. 2 the stress-strain curves for AISI 347 base metal and weld metal at an elevated temperature (say 1800° F.) are presented. Stress is plotted vertically and strain horizontally. It is seen that the curve for the weld metal extends well above the curve for the base, particularly beyond the points 25 and 27, respectively, of maximum stress. The weld metal then has a substantially higher stress at the temperature corresponding to the curves than the base metal. If by reason of the thermal stress S (Fig. 1) exerted when the structure is heating or cooling the strength of the base metal is exceeded, a crack develops in the base metal and the structure fails.

Figure 3:
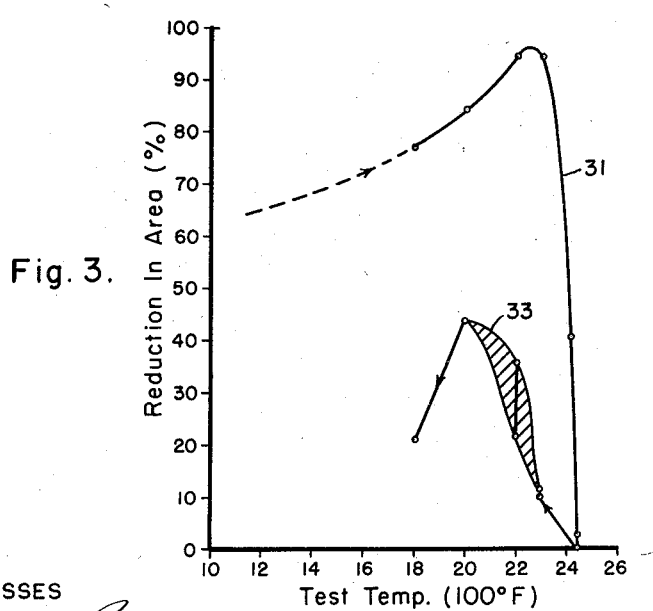
Fig. 3 is a graph presenting the ductility properties of base metal of stainless steel AISI 347 during heating and cooling.
Figure 5:
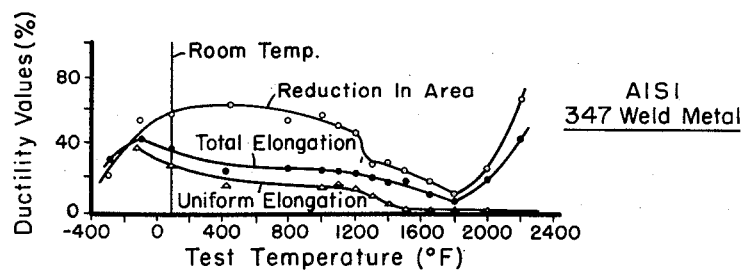
Fig. 5 is a graph presenting the ductility properties of weld metal of AISI 347 during heating.

AISI 347 weld metal also has a low hot ductility. This can be seen from Fig. 5 which was plotted from data derived from measurements made with specimens of weld metal. In Fig. 5 ductility measured either by reduction in area or by total elongation is plotted vertically and temperature horizontally. It is seen that between 1200 and 2000° F. the ductility falls to a low magnitude. The effect of heating and then cooling base metal made of AISI 347 on ductility is shown in Fig. 3. In this case reduction in area is plotted vertically and temperature horizontally. The data for the upper branch 31 of this graph was derived by stressing a number of base metal specimens to fracture at progressively higher temperatures up to about 2500° F. and in each case determining the reduction in area at fracture; the data for the lower branch 33 of this curve was derived by stressing a number of weld metal samples to fracture, at progressively lower temperatures beginning at about 2500° F., and in each case determining the reduction in area. It is seen that the ductility is high (75 to 95%) while the metal is being heated but drops to a relatively low magnitude (32 to 42%) while the weld metal is cooling.

Thus Figs. 2, 3 and 5 show that a structure composed of AISI 347 base metal and weld metal would have a tendency to fail because of the relationship between the hot strengths of the weld metal and the base metal and also because of the low ductility of the structure, particularly while the weld metal is cooling.

Figure 4:
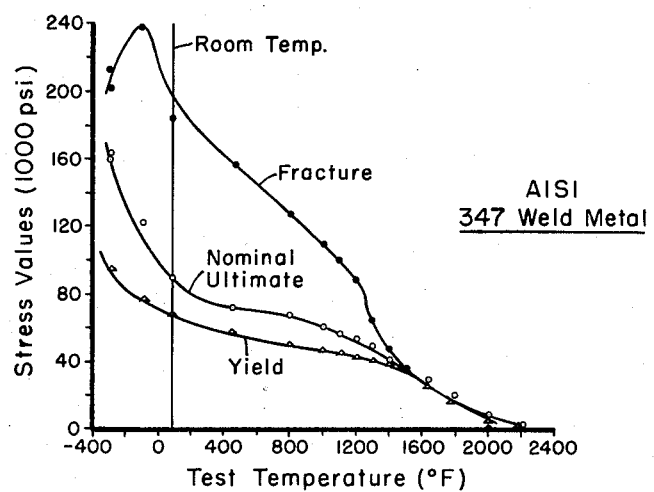
Fig. 4 is a graph presenting the strength properties of weld metal of AISI 347 during heating and cooling.
Figure 6:
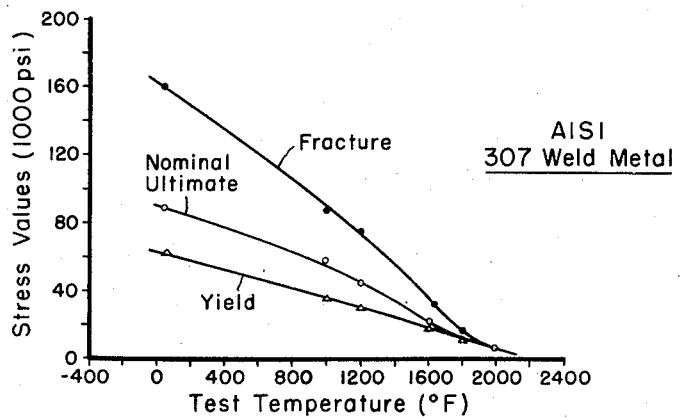
Figs. 6 and 7 are graphs similar to Figs. 4 and 5, respectively, but presenting the properties of weld metal of AISI 307.
Figure 7:
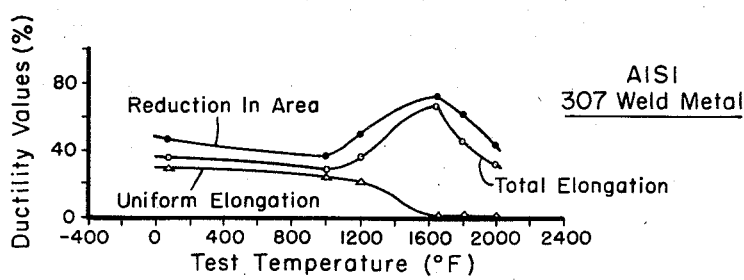

The relationship between the hot strengths of AISI 347 and AISI 307 weld metal is shown in Figs. 4 and 6. In these graphs stress is plotted vertically and temperature horizontally. Three curves are presented in these graphs; the fracture stress curve, the nominal ultimate stress curve and the yield stress curve. The data for these curves was derived by stressing specimens of weld metal to fracture and measuring the fracture, nominal ultimate and yield stresses. It is seen that the magnitude of the properties measured is low (of the order of 12000 to 13000 pounds per square inch) between 1800 and 2000° F. for the AISI 307 and is substantially higher of the order of 19000 pounds per square inch for the AISI 347. The low hot strength of the 307 weld metal is about equal to the hot strength of 347 base metal. Further, as shown in Fig. 7, in which ductility of AISI 307 measured by reduction in area or total elongation is plotted vertically and temperature horizontally, the ductility of the AISI 307 between 1800 and 2000° F. is high. Thus the AISI 307 as a weld metal has ideal properties for use in the welding of AISI 347.

Figure 8:
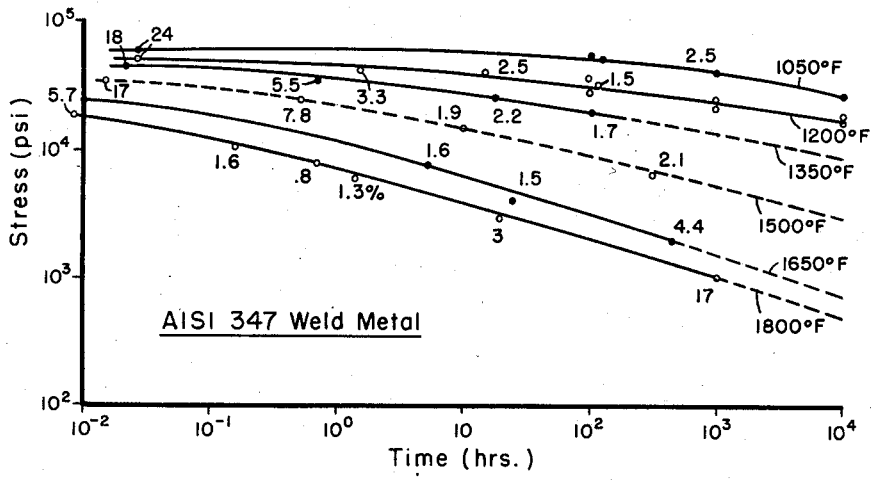
Fig. 8 is a graph showing generally the creep curves for different materials.
Figure 8:
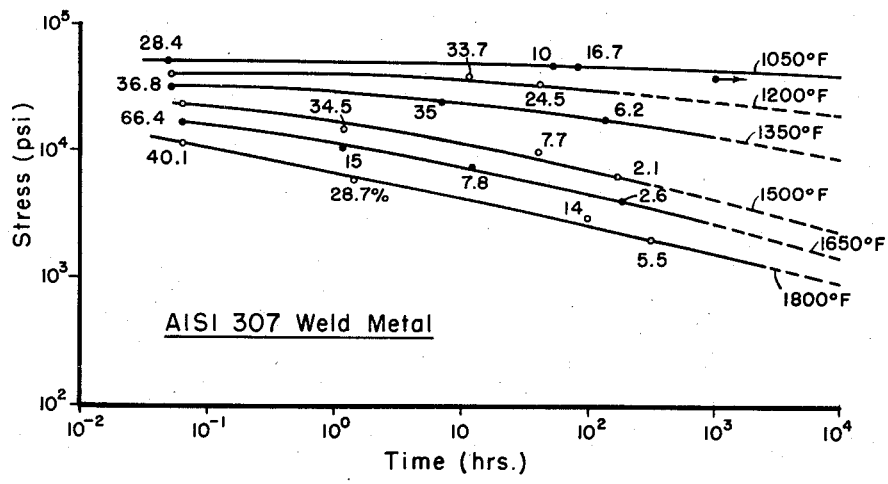
Figure 8:
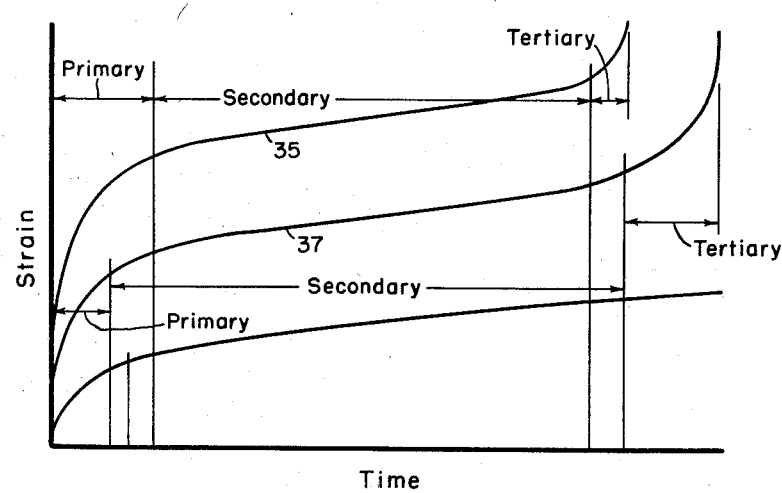

The superiority of the composite welded structure in accordance with this invention is particularly manifested by considering the creep properties of the weld metal. In measuring creep properties the weld metal is subjected to continuous stress and the strain is measured at different time intervals after the stress is initially applied. Typical creep curves for a number of materials under a given stress are presented in Fig. 8. Here strain is plotted vertically and time horizontally. The upper creep curves 35 and 37 are seen to have three regions, the primary region during which the strain increases at a substantial time rate following the initial stressing of the material, the secondary region in which the strain increases at a relatively low time rate and the tertiary region in which the strain increases at a very high time rate. It is desirable in the case of any material which is to serve for steam conductors in a steam turbine generator that the secondary portion of the creep curve be relatively long and the AISI 307 steel meets this condition.

This is further illustrated in Figs. 9 and 10. Fig. 9 presents a family of curves each corresponding to a different temperature as indicated and each giving the rupture stress as a function of time for AISI 347 weld metal. The data for each of these curves was derived by subjecting specimens of the AISI 347 weld metal to different stresses continuously at the temperature indicated for the curve until fracture occurred. The total elongation at the various observed points was also measured and is indicated adjacent most of the points. It is seen that at 1800° F. while subject to stress of about 8000 to 9000 pounds per square inch, the AISI 347 weld metal failed in about one hour having an elongation of about 1.3%. The corresponding curves for AISI 307 are shown in Fig. 10. It is seen that at 1800° F. rupture occurred when the weld metal was subject to a stress of about 8000 to 9000 pounds per square inch, the total elongation being 28%. In a structure where such high strain magnitudes (28%) cannot occur, there can be no failure. This demonstrates the superiority of the AISI 307 weld metal.

Another illustration of the creep superiority of the AISI 307 is the results produced with 0.505 inch diameter specimens of each of the metals when stressed at 30,000 pounds per square inch at 1050° F. The AISI 347 weld metal failed in 5030 hours with only .3% total strain. The AISI 307 weld metal similarly loaded and at the same temperature has not failed in more than 7000 hours.

The composition welded structure described herein, as is demonstrated by fracture tests, thus does not have the tendency manifested by the prior art structure to fail either during the welding and the subsequent cooling or after long intervals after the structure has been welded.

While preferred embodiments of this invention have been disclosed herein, many modifications thereof are feasible. The invention, therefore, is not to be restricted except as so necessitated by the spirit of the prior art.

I claim as my invention:

1. A welded structure comprising a base of an alloy consisting essentially of

| | |
|---|---|
| Chromium | 17% to 20%. |
| Nickel | 9% to 12%. |
| Manganese | 2.5%—maximum. |
| Silicon | .8%—maximum. |
| Carbon | .08%—maximum. |
| Phosphorous | .04%—maximum. |
| Sulphur | .04%—maximum. |
| Niobium | At least 10 times carbon content. |
| Iron | Remainder. | and a weld of a weld metal consisting essentially of

| | |
|---|---|
| Chromium | 18% to 20.5%. |
| Nickel | 9% to 10.7%. |
| Manganese | 3.3% to 4.75%. |
| Silicon | .80%—Maximum. |
| Carbon | .07% to .17%. |
| Phosphorous | .04%—maximum. |
| Sulphur | .04%—maximum. |
| Molybdenum | 1.10%—maximum. |
| Iron | Remainder. |

2. The method of arc welding a base structure composed of an alloy consisting essentially of

| | |
|---|---|
| Chromium | 17% to 20%. |
| Nickel | 9% to 12%. |
| Manganese | 2.5%—maximum. |
| Silicon | .8%—maximum. |
| Carbon | .08%—maximum. |
| Phosphorous | .04%—maximum. |
| Sulphur | .04%—maximum. |
| Niobium | At least 10 times carbon content. |
| Iron | Remainder. | which comprises producing a welding arc between said structure and a welding electrode of an alloy consisting essentially of

| | |
|---|---|
| Chromium | 18% to 20.5%. |
| Nickel | 9% to 10.7%. |
| Manganese | 3.3% to 4.75%. |
| Silicon | .80%—maximum. |
| Carbon | .07% to .17%. |
| Phosphorous | .04%—maximum. |
| Sulphur | .04%—maximum. |
| Molybdenum | 1.10%—maximum. |
| Iron | Remainder. | melting said electrode and depositing the melted metal from said electrode in the region where said structure is to be welded.

3. The method of arc welding austenitic stainless steel of the chromium-nickel-niobium type by producing a welding arc between a welding electrode and a base of said austenitic steel, melting the electrode and depositing the melted electrode on said base, the said method being characterized by a welding electrode of stainless steel of the chromium-nickel type having between 3.3% and 4.75% manganese and up to 1.1% molybdenum.

4. An austenitic welded structure consisting of parts composed of a base metal joined together by weld metal, said base metal and said weld metal being composed of different austenitic alloys, the hot strength of said weld metal alloy being substantially equal to the hot strength of said base metal alloy and the hot ductility of said weld metal alloy being substantially higher than the hot ductility of said base metal alloy.

References Cited in the file of this patent

UNITED STATES PATENTS

| | | |
|---|---|---|
| 2,156,298 | Leitner | May 2, 1939 |
| 2,159,497 | Becket | May 23, 1939 |
| 2,481,385 | Bloom | Sept. 6, 1949 |

FOREIGN PATENTS

| | | |
|---|---|---|
| 821,603 | France | Aug. 30, 1937 |